United States Patent [19]

Meyer et al.

[11] 3,889,269

[45] June 10, 1975

[54] AQUEOUS INK FOR USE IN THE INK JET PROCESS

[75] Inventors: Rudolf Meyer; Klaus Hoffmann; Karl-Heinz Freytag, all of Leverkusen; Hans Vetter, Cologne, all of Germany

[73] Assignee: Agfa-Gevaert Aktiengesellschaft, Leverkusen-Bayerwerk, Germany

[22] Filed: Nov. 27, 1973

[21] Appl. No.: 419,260

[30] Foreign Application Priority Data

Dec. 1, 1972  Germany............................ 2258835

[52] U.S. Cl. ................. 346/1; 106/22; 117/37 LE; 117/93.4 N; 117/93.4 C; 117/104 R; 117/105.3; 118/624; 118/DIG. 23; 346/75; 355/10; 355/17; 117/93.4 A
[51] Int. Cl.. C01d 15/16; C01d 15/18; C01d 15/20
[58] Field of Search...... 117/37 LE, 93.4 N, 93.4 C, 117/104 R, 105.3, 93.4 A; 106/22; 346/75; 355/10, 17; 118/DIG. 23, 624

[56] References Cited

UNITED STATES PATENTS

| | | | |
|---|---|---|---|
| 2,600,129 | 6/1952 | Richards | 299/1 |
| 3,060,429 | 10/1962 | Winston | 346/1 |
| 3,150,976 | 9/1964 | Johnson | 117/37 LE |
| 3,389,108 | 6/1968 | Smith et al. | 106/22 |
| 3,560,204 | 2/1971 | Damm | 117/37 LE |
| 3,715,219 | 2/1973 | Kurz et al. | 106/22 |
| 3,798,656 | 3/1974 | Lowy et al. | 346/75 |

*Primary Examiner*—Michael Sofocleous
*Attorney, Agent, or Firm*—Connolly and Hutz

[57] ABSTRACT

Inks that are used in the ink jet process consist of an aqueous solution of a watersoluble dye which contains in addition a hydroxyalkylformamide. The latter compound prevents premature drying of the ink without increase of the viscosity of the ink.

4 Claims, No Drawings

AQUEOUS INK FOR USE IN THE INK JET PROCESS

This invention relates to a process for recording information by spraying colored inks on to a support and it relates in particular to aqueous inks which are suitable for this process.

In German Auslegeschrift No. 1,271,754 there has been disclosed a process in which information in the form of screen or continuous tone images can be recorded in one or more colors on a moving support by means of a very fine jet of ink which is modulated by electric signals. This process is known as the ink jet process. The liquid ink used as information medium is sprayed on to the support from a fine nozzle under high pressure, preferably between 20 and 60 excess atomospheres. The jet from the nozzle breaks up into discrete drops after a certain distance and these drops are individually guided towards the support or are deflected from their original direction by the arrangement described above according to the information which is required to be recorded. It is therefore very important for the quality and accuracy of the information that the jet of ink should always break up into drops of equal size and also at equal time intervals. For this reason it has already been proposed that the instability of the ink jet could be increased by means of ultrasonic transmittal with a view to obtaining ink drops which are as uniform in size as possible. However, the ink jet may still not break up completely uniformly. Smaller and larger drops may be formed. This has the disadvantage that drops which vary in size also vary in the length of their flight times until they result in the coalescence of two or more drops and hence introduce visible errors into the recording.

Another problem lies in the choice of suitable inks which satisfy the particular requirements of the ink jet process. The known inks water-based are not suitable for this purpose because they dry too easily and therefore if left unused for any length of time are liable to block the fine nozzles due to crystallisation of the dyes. Organic solvents, on the other hand, are undesirable for various reasons, e.g. flammability or toxicity. It is already known, for example in oil-free stamping inks, that glycerine can be added to aqueous dye solutions to prevent their drying out. Such inks based on glycerine and water are, however, less suitable for use in the ink jet process on account of their relatively high viscosity. First, this is because they cannot flow through the narrow nozzles sufficiently quickly, with the result that at high writing speeds the images are insufficiently covered. Second, it is because in such inks there is considerable tendency for drops of unequal sizes to form in the ink jet, which has the disadvantages already described above.

It has now been found that these disadvantages can be obviated and the quality of the recordings substantially improved by keeping the viscosity of the ink as low as possible. If possible, the viscosity ($\eta$) of the ink at room temperature should not be greater than 1.35 cP. It is, of course, possible to lower the viscosity of the dye solutions by raising the temperature and thereby ensure a sufficient rate of flow through the narrow nozzles, but this would require complicated and expensive heating devices.

Compounds have now been found which when added to aqueous inks prevent drying without substantially increasing the viscosity. These compounds are hydroxyalkyl formamides.

This invention relates to an aqeuous ink for use in the ink jet process which is in the form of an aqueous solution containing a water-soluble dye and a substance which prevents drying, characterised by containing a compound of the following formula I

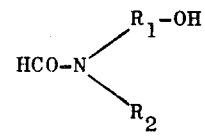

in which
$R_1$ is an alkylene group, preferably containing up to 4 carbon atoms, which may be straight chain or branched chain, e.g. an ethylene, 1,2-propylene, 1,3-propylene or 1,4-butylene group, and
$R_2$ is hydrogen or an alkyl group, preferably containing up to 4 carbon atoms, e.g. methyl; the alkyl group may be substituted, preferably with hydroxyl or formylamino.

The following are examples of suitable compounds which prevent drying:
β-Hydroxyethylformamide,
γ-hydroxypropylformamide,
βhydroxypropylformamide,
γ-hydroxybutylformamide,
N-methyl-N-β-hydroxyethylformamide,
N,N-bis-(β-hydroxyethyl)-formamide,
N-β-hydroxyethyl-N-β-formylaminoethylformamide.

The preparation of β-hydroxyethylformamide has been described in J.Amer.Chem.Soc. 57, 1080 (1935). The other hydroxyalkylformamides are prepared in analogous manner.

Colored inks for the ink jet process which have the desired low viscosity at room temperature and which do not dry in air even when left to stand for a long time can be prepared with the aid of the above mentioned compounds.

According to the invention, the inks for the ink jet process consist substantially of an aqueous solution of a water-soluble dye with the addition of the substance which prevents drying. Good results are obtained when the inks of the invention contain between 4 and 20 % by weight of the hydroxy alkyl formamides.

Dyes for inks are already known in large numbers from the chemistry of writing fluids. Reference may be made in this connection, for example, to Ullmanns Enzyklopaedie der technischen Chemie, Volume 15, 3rd Edition 1964, page 351. The dyes must be readily water-soluble so that they will give rise to a deep colored solution even at low concentrations. Suitable inks for the ink jet process generally contain between 4 and 10% by weight of dye. The dyes must also be highly lightfast. This requirement must be fulfilled not only by the aqueous solution of the dyes but also by the dyes themselves when they have been applied to the support.

The dyes may only have a slight tendency to crystallisation so that there will be no risk of blocking the fine nozzles with crystallized dyes. The use of antidrying agents according to the invention prevents depletion of the dye solution in, such as water, and thus prevents crystallization of the dye. In some cases, the tendency toward crystallization can also be reduced by mixing several dyes. It goes without saying that acid dyes must not be mixed with basic dyes. Mixing dyes may also be advantageous for the purpose of obtaining the desired color tone.

In order to obtain smudge-resistant, sharp dye images, it may be advantageous to impregnate the support with a dye mordant which fixes the dye.

EXAMPLE 1

Formulations for suitable inks according to the invention are given below. They all have a viscosity below 1.35 cP at room temperature (20° to 25°C) and are "not yet dried" after they have been left to stand in air at 55% relative humidity for 5 days. Drying is assessed as follows: 1 ml of ink is dripped on to a glass plate and left to stand at room temperature and 55% relative humidity. The ink is described as not yet dried if it is still absorbed by filter paper (Blauband Filter of Schleicher-Schüll). In cases where no antidrying agent is used, drying is found to have occurred at the latest after 2 hours.

1. Yellow ink
   1.6 g of dye I
   1.6 g of dye II
   0.4 g of dye III
   126 ml of water
   8 ml of γ-hydroxypropylformamide phatic isocyanate for an asymmetric urea. For information on the individual reactions, reference may be made, for example, to Houben-Weyl, Methoden der Organischen Chemie, Volum X/3, Fourth Edition 1965.

For example dye II may be prepared as follows.

31.1 Parts by weight of 2-aminonaphthalene-4,8-disulfonic acid are diazotized in the usual manner and then combined with a solution of 22.4 parts by weight of 1-amino-3(α-carboxymethoxy-acetamino)-benzene in a mixture of 14 parts by volume of concentrated hydrochloric acid and 300 parts by volume of water. 100 Parts by volume of a 20% aqueous sodium acetate solution are then added dropwise. A yellow dye is produced. After termination of the coupling reaction, the amino monoazo dye is heated to 70°C, precipitated with 140 parts by weight of rock salt and suction filtered. The resulting dye is dissolved in 600 parts by volume of water at pH 7.0–7.5. A solution of 10 parts by weight of methyl isocyanate in 90 parts by volume of toluene is then added dropwise at 30° to 40°C. After termination of the reaction, the dye is isolated with 120 parts by weight of rock salt at 70°C. It is a yellow powder when dry.

2. Magenta inks
   a. 3.5 g of dye IV
      1.0 g of dye V

Dye I

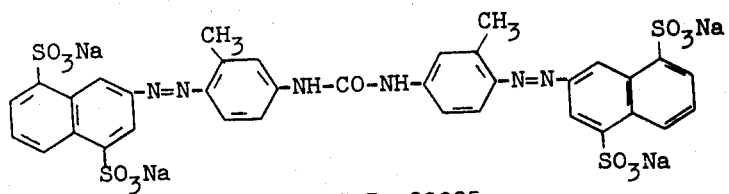

C.I. 29025

Dye II

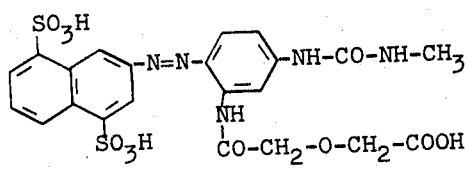

Dye III

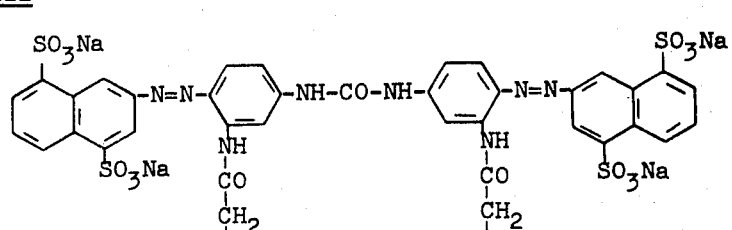

Dyes II and III have been described in German Patent Application (P 22 58 836.9)(A-G 1031).

For producing the yellow dyes II and III it is convenient to start with diazotized aminonaphthalene-disulfonic acid which is coupled with 1-aminobenzene-3-dicarboxylic acid amides and then reacted either with phosgene to produce a symmetrical urea or with an ali- 131 ml of water
10 ml of β-hydroxyethylformamide
b. 3.5 g of dye IV
   1.0 g of dye V
   111 ml of water
   10 ml of γ-hydroxypropylformamide Dyes IV and V have been described in German Patent Dye IV

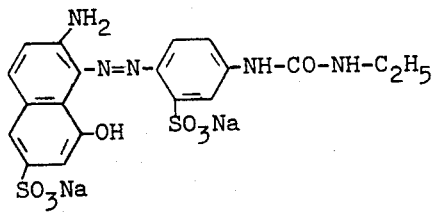

Dye V

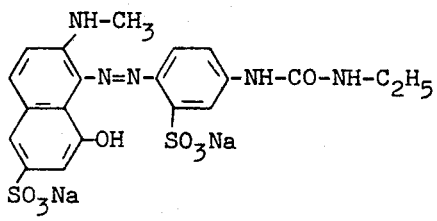

Application P 22 58 837.0 (A-G 1032). The magenta dyes IV and V may be prepared from diazotized p-nitroanilinosulfonic acid which is coupled with 2-amino-8-hydroxynaphthalene sulfonic acids, then reduced in the usual manner and finally reacted with isocyanates to form asymmetric ureas.

Dye IV for example has been prepared as follows.

23.8 Parts by weight of 5-nitro-2-aminobenzenesulfonic acid-1 are stirred up in 500 parts by volume of water. 15 Parts by volume of concentrated hydrochloric acid are then added. Diazotization is then carried out with 16 parts by volume of 30% sodium nitrate solution at 0 to 5°C. After termination of diazotization, the excess of nitrous acid is destroyed and a solution of 23.9 parts by weight of 2-amino-8-hydroxynaphthalene sulfonic acid-6 in 500 parts by volume of water is run in. A dye is formed at pH 4.5 to 6. After termination of the coupling reaction, the reaction mixture is adjusted to pH 10.0 and reduced with sodium sulfonic in known manner. The dye is then precipitated with 240 parts by weight of rock salt and then dissolved neutral in 500 parts by volume of water, whereupon a solution of 7.1 parts by weight of ethyl isocyanate in 100 parts by volume of toluene is added dropwise with stirring. A magenta dye precipitates. It is suction filtered and dried.

3. Cyan ink 2 g of Sirius light turquoise GL (C.I. 74 180)

50 ml of $H_2O$ 3 ml of β-hydroxyethylformamide

Example 2

A non-drying dye ink based on glycerine and having the following composition:

370 ml of water 25 g of Astraviolet 3R (C.I. 48 013)

50 ml of glycerine has a viscosity of $\eta_{20 °C} = 1.55$ cP at room temperature. If the glycerine is replaced in accordance with the invention by an equal quantity of N-hydroxyethyl formamide, then the viscosity of the ink is found to be $\eta_{20 °C} = 1.3$ cP. This ink is much more suitable for ink jet process on account of its higher rate of throughflow.

We claim:

1. In a process for producing an image on a surface by the application of an ink the steps comprising moving a surface on a support, forming a jet of ink containing water soluble dye in an aqueous solution, directing the ink in the form of a jet onto the moving surface, modulating the applied ink jet by electrical signals, said signals being related to the image wherein the improvement comprises the ink in addition contains as a substance that prevents drying a compound of the formula

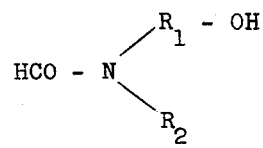

in which $R_1$ is an alkylene group containing up to 4 carbon atoms, and $R_2$ is a hydrogen atom or an alkyl group containing up to 4 carbon atoms.

2. A process as claimed in claim 1, in which the substance is β-hydroxyethylformamide, γ-hydroxypropylformamide, β-hydroxy-propylformamide, γ-hydroxybutylformamide, N-methyl, N-β-hydroxyethylformamide, N,N-bis-(β-hydroxyethyl)formamide, or N-β-hydroxyethyl-N-β-formylamine ethyl formamide.

3. A process as claimed in claim 1 in which the ink contains 4 to 10 % by weight of dye.

4. A process as claimed in claim 1, in which the ink has a viscosity not in excess of 1.35 cP.

* * * * *